July 14, 1959  W. R. HEDRICK  2,894,690
DOUBLE SPLICE BAR RAIL JOINT
Filed Feb. 1, 1957  2 Sheets-Sheet 1
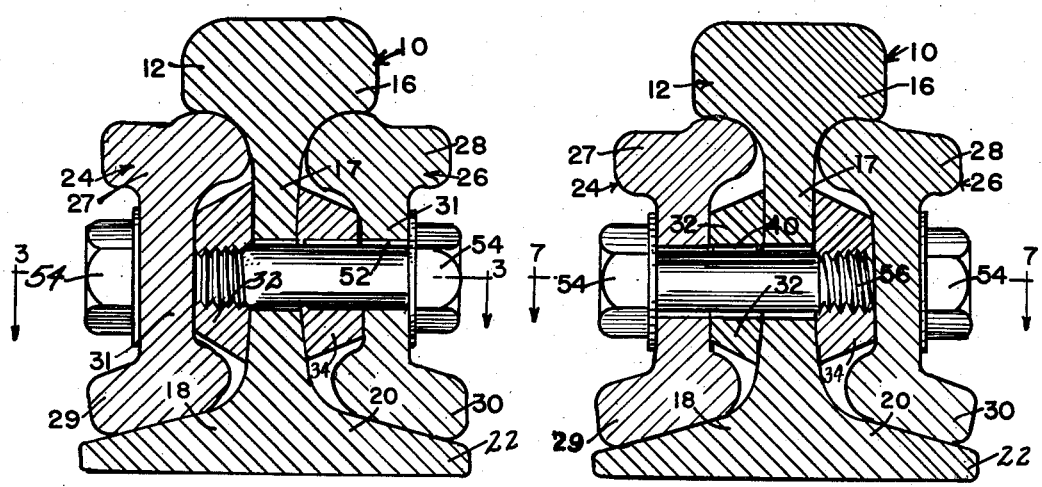
FIG. 1  FIG. 2
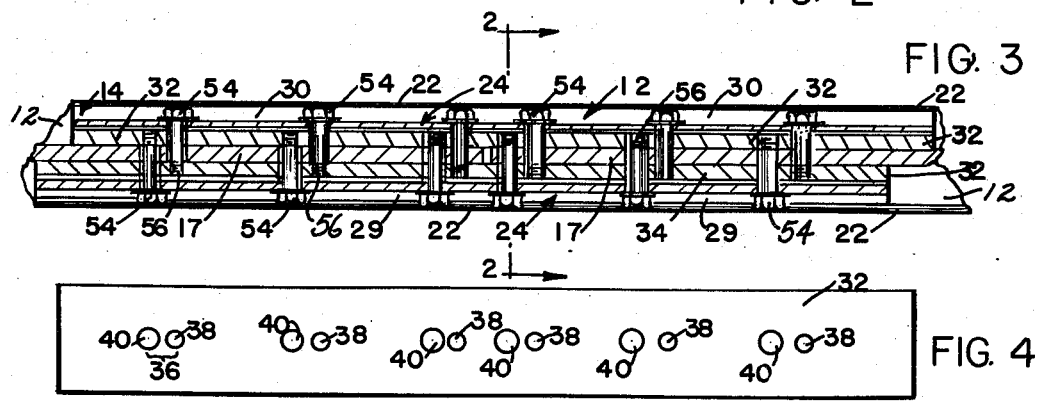
FIG. 3
FIG. 4
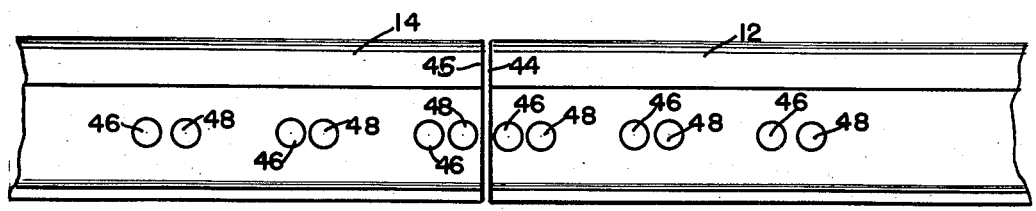
FIG. 5
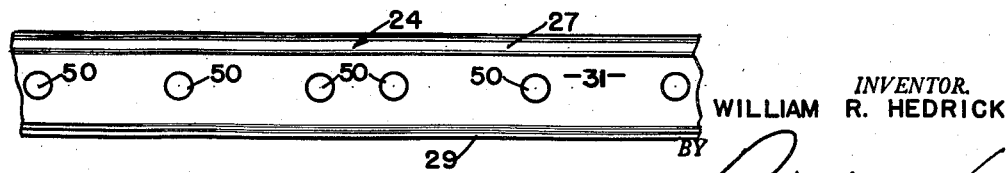
FIG. 6
INVENTOR.
WILLIAM R. HEDRICK
BY
ATTORNEY

INVENTOR.
WILLIAM R. HEDRICK

United States Patent Office 2,894,690
Patented July 14, 1959

2,894,690

DOUBLE SPLICE BAR RAIL JOINT

William Rufus Hedrick, Knoxville, Tenn., assignor to Hedrick Rail Joint Trust (George P. Dillard, trustee), Atlanta, Ga.

Application February 1, 1957, Serial No. 637,701

6 Claims. (Cl. 238—244)

This invention relates to a double splice bar rail joint and especially to a rail joint of this sort for joining the terminal ends of railroad rails by bolting them in near abutting end relation.

Generally described, without limitation on the scope of this invention which is defined in the claims, the rail joint is an improved form whereby bolts are inserted from opposite sides of the rail and connect in threaded engagement with added inner splice bars inside a respective outer splice bar. The conventional rail is provided with extra bolt holes and the usual outer splice bars (one on each side) of the conventional "dog-bone" cross-section are used much in their normal positions on a respective side and a special inner splice bar of elongated, thick, flat construction has matching holes for bolts from one side coming through to the other and are tapped with threads matching and receiving the bolts coming into it from the other side. With this arrangement, there is an inner splice bar between each outer splice bar and the rail web and bolts are placed, preferably alternating, from one side through the rail threading into the inner splice bar and from the other side to the other inner splice bar. It is possible therefore to eliminate the conventional nuts altogether thereby eliminating the individual looseness thereof from vibration and also eliminating the need for holding the nuts when it is necessary to tighten the bolts; and the number of bolts per foot may be increased with little additional weight.

A primary object of this invention is to provide a strengthened rail joint of simple construction and operation.

An additional object is found in the novel use of inner splice bars having tapped holes therein receiving the bolts from the opposite side.

Another advantage resides in the arrangement which permits bolting the entire joint without the use of nuts, when preferred.

Another important feature of the present invention is found in the arrangement permitting conventional rails (those already constructed and installed) to be modified in a simple and expedient manner to receive the present improvement. This is accomplished simply by drilling additional holes in the rails. The same outer splice bars may be used without additional modification if one of them is shifted longitudinally to the new hole position of that side.

Other and further objects and advantages of my invention will be apparent from the following description taken in conjunction with the accompanying drawings, in which:

Fig. 1 is a vertical, cross-sectional view through one bolt hole of my splice bar arrangement in position connecting two rails.

Fig. 2 is a vertical cross-sectional view taken substantially along the line 2—2 in Fig. 3 and being a section in elevation similar to Fig. 1 at the next succeeding bolt hole.

Fig. 3 is a central, longitudinal, cross-sectional view taken along the line 3—3 in Fig. 1 and showing the rail, the outer and inner splice bars, and bolts in position.

Fig. 4 is a side elevation view of an inner splice bar of this invention.

Fig. 5 is a side elevation view of the modified form of the two rail ends.

Fig. 6 is a fragmentary side elevation view of a conventional outer splice bar which may be used in this invention.

Figure 7:
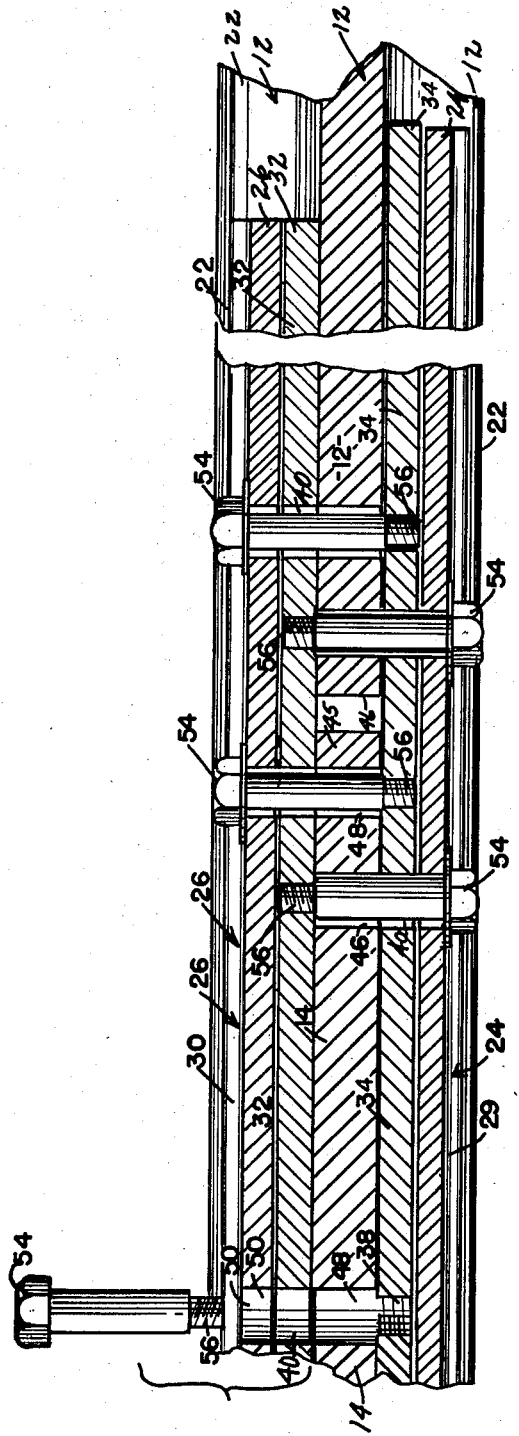
Fig. 7 is an enlarged closs-section view taken along the line 7—7 in Fig. 2 and represents substantially an enlargement of a portion of Fig. 3.

Referring to the drawings, my invention designated generally at 10 is for the purpose of connecting together two conventional railroad rails 12, 14 in end to end relation, such as found in constructing a continuous railroad track. Each rail has an upper track portion 16, center web 17 with respective side web portions 18, 20 extending into the bottom foot portion 22 normally bolted or nailed by spikes to the cross ties.

A pair of elongated, outer splice bars 24, 26 of conventional cross-section in a "dog bone-like" shape each has a respective upper bead 27, 28 and a lower bead 29, 30 and web portion 31. Each splice bar is positioned, in its conventional manner, with the respective upper bead 27, 28 thereof engaging the underside of the rail track 16 and with the lower bead 29, 30 thereof resting on the rail foot 22 and these splice bars 24, 26 are mounted in pairs on respective opposite sides of the rail web 17, spaced from the respective sides 17, 18.

A pair of identical inner splice bars 32, 34 are mounted on the rails 12, 14 in substantially continuous fashion to the outer splice bars 24, 26. Each inner splice bar 32, 34 is a hardened steel, flat elongated member (see Fig. 4) in which has been drilled or otherwise formed pairs of transverse holes 36 with each pair having one tapped or threaded hole 38 and adjacent thereto an enlarged, through hole 40. Inner splice bar 32 is positioned inside of outer splice bar 24 and against side 18 of web 17 thereby placing it in confinement between the outer splice bar 24 and rails 12, 14. Likewise, splice bar 34 is positioned on the other side of the rails 12, 14 between the outer splice bar 26 and the side 20 of the web 17.

The ends 45, 44 of a respective rail 12, 14 are positioned almost in abutment (see Fig. 5) and with the rails in a contiguous manner with the outer splice bars 24, 26 and inner splice bars 32, 34 extending about the terminal junction of rails 12, 14 and for a distance along each rail. Conventional rails 12, 14 normally already have drilled therein enlarged holes 46 (in this model there are three in each rail end) and there is provided by this invention an additional enlarged hole 48 adjacent each hole 46. Center to center, the distance from holes 48 to 46 should be about the same as between holes 38 and 40 in splice bars 32, 34. Outer splice bars 24, 26 have respective enlarged holes 50, 52 therein.

With inner splice bars 32, 34 in position inside of outer splice bars 24, 26 mounted on rails 12, 14, outer splice bar holes 50 in splice bar 24 are aligned with one set of holes 46 or 48 in the rails 12, 14 and the enlarged holes 40 in the inner splice bar 32. Similarly, outer splice bar holes 52 in bar 26 are aligned with the other set of holes 46 or 48 in rails 12, 14 and with the enlarged holes 40 in inner splice bar 34. Each hole set 50, 40, 46 or 48 leads to the threaded opening 38 in the inner splice bar 32 on the opposite side. A number of large, tempered, heavy duty bolts 54 are inserted through the holes 50, 40 and the rails 12, 14 and each has a threaded end 56 thereon with threads to match the tapped opening or threaded hole 38 in splice bars 32, 34. Working from opposite sides of the rails 12, 14, a bolt is inserted in a hole 50 through outer splice bar 24, through inner splice bar hole 40, through rail hole 46 or 48, thence threadedly tightened into the hole 38 on the splice bar 34 on the opposite side of the rails 12, 14 from the head of the bolt (see Fig. 2). In similar fashion, bolts 54 are threaded through the splice bars and rails from opposite sides alternating from one side to the other. In the present embodiment there are 6 bolt holes and matching holes 38 in the inner splice bars 32, 34 for each side, for a total of 12 bolts. A metal washer 58 is provided for each bolt 54. With this arrangement, there are 6 bolts from each side alternating from one side to the other, and the joint occupies no more room than the conventional six bolt one.

Tightening the bolts 54 (which is readily done with a wrench by one person without any nut to hold) locks the respective outer splice bar 24 or 26 against the respective rail side 17 or 18 pulling the inner splice bar from the other side of the rails 12, 14 against that side of the rail and the same action is attained from the other side. Therefore, the pressure is made and distributed from each side of the rails 12, 14 and a better locking action is attained. Since vibration is the worst enemy of a rail joint, the present apparatus resists vibration by its alternating type of bolted construction and more bolts per foot. In addition, the rails are double spliced by means of both inner and outer splice bars 32, 34 and 24, 26, respectively, on each side of the rails 12, 14 between the joined ends thereof.

In order that the conventional outer splice bars 24, 26 may be used directly without modification and without extra holes having to be added, splice bar 26 is staggered about the rail ends so that its ends are not exactly in alignment with the ends of bar 24 thereby permitting the holes 50 in outer bar 24 to match with one set of rail holes 46 while on the other side an identically constructed outer bar 26 has matching holes 52 with the other rail holes 48. Therefore one end of bar 24 protrudes a distance about equal to the distance between centers of holes 46, 48. Likewise, so that identical inner splice bars 32, 34 can be used interchangeably on either side, one bar 32 is staggered from one end the same distance as in the case of the outer bars 24, 26.

The present apparatus provides a stronger joint and one that is not significantly heavier than the conventional splice bar type. Bolts are easier to insert and align and easier to tighten. If desired, some bolts may be eliminated as by omitting every other one on opposite sides or by omitting the ones at the very ends or the like. Also, splice bars 32 are shown as one piece but obviously may be made in two or more separate sections or pieces.

The additional bolts 54 at the terminal ends of the rails 12, 14 maintain better alignment and reduce the striking of one rail end against the other when trains pass thereover which gradually pushes the rails out of their cross ties from the creep thereof. The holes 50, 52 and 40 and 46, 48 are all oversized in comparison with the size of the bolts 54 thereby permitting and allowing expansion or contraction of the rails with respect to each other, as occurs from colder weather to hot and vice versa. The fact that the nuts of conventional construction are eliminated and the inner splice bars 32 are receiving the bolts 54, allows use of a shorter bolt 54 thereby saving a large amount of cost over miles of track to offset any additional cost of the added bolts per rail foot.

While I have shown an actual embodiment taken from an actual rail joint constructed in accordance with my invention, I do not wish this considered any sort of limitation on my scope of protection since various alterations, eliminations, substitutions, variations, modifications, and other changes not shown in the drawings or stated specifically herein may be made within the scope of my invention as defined in the appended claims.

I claim:

1. In a double splice bar rail joint for connecting the terminal ends of two rails together and including an outer splice bar on each side of the rail each overlapping the terminal ends of said two rails on a respective side thereof, at least one first additional inner splice bar positioned coextensive with part of the length of one of said outer splice bars on one side of said rails between said rails and said outer splice bar on that side and having threaded openings therein to receive bolts therein, there being openings at said inner splice bar to permit bolts to pass therethrough, at least one second additional splice bar located on the opposite side of said rail from said first additional splice bar in coextensive relationship with part of the length of said outer splice bar on the other side of said rails from said first additional splice bar between said rails and said outer splice bar and having threaded openings therein, there being openings at said inner splice bar to permit bolts to pass therethrough, said outer splice bars and said rail having aligned openings therein to accommodate bolts therethrough, and bolts inserted through an opening in said outer splice bar on one side, through an aligned opening in said rail and threadily engaging an aligned threaded opening in said first additional splice bar on the other side, and other bolts inserted through an opening in said outer splice bar on the other side and passing through an aligned opening in said rail threadily engaging an aligned threaded opening in said second additional splice bar on the other side from said first additional splice bar, whereby said outer splice bars are connected on said rail under pressure from opposite sides by said bolts, and the heads of some of said bolts are located on opposite sides of said rail from others.

2. In a double splice bar rail joint for connecting the terminal ends of two rails together and including an outer splice bar on each side of the rail across said adjacent rail ends, a first inner splice bar positioned between one of said outer splice bars and said rail on one side of said rail and extending coextensively across said rail ends with said outer splice bar, a second inner splice bar positioned between said other outer splice bar and said rail on the opposite side of said rail and extending coextensively across said terminal rail ends, each of said first and second inner splice bars having a plurality of enlarged holes and a plurality of threaded holes therein, said outer splice bars and said rail having enlarged openings therein to accommodate bolts therethrough, a plurality of bolts positioned in said openings with some of said bolts being inserted from one side through a respective aligned opening in said outer splice bar, a respective aligned opening in said first inner splice bar and a respective aligned opening in said rail and threadily engaging said second splice bar threaded opening aligned on the opposite side, and other of said bolts extending from said other side through a respective aligned opening in said outer splice bar, through a respective aligned opening in said second inner splice bar, through a respective aligned opening in said rail and threadily engaging said first inner splice bar aligned threaded opening.

3. In a double splice bar rail joint for connecting the terminal ends of two rails together wherein outer splice bars extend across the terminal ends of said rails on each side of the rails and have enlarged holes therein for alignment with holes in the rails, a first elongated, inner splice bar positioned between one of said outer splice bars and said rail on one side thereof and having through openings therein for alignment with an opening in said outer splice bar and said rail, said first inner splice bar having threaded openings therein for alignment with other openings in said rail and said outer splice bar to receive a threaded bolt therein, a second inner splice bar positioned between said other outer splice bar and said rail on the opposite side from said first inner splice bar and having openings therein for alignment with respective openings in said outer splice bar and said rail, said first and second splice bars extending continuously from one rail across the ends of said adjacent rail ends, bolt means having threaded ends insertible through the holes in said outer splice bar, first inner splice bar, and said rail and threadily engaging said second inner splice bar for tightening therein, other bolt means having threaded ends insertible from the other side through the holes in said outer splice bar, through said second inner splice bar and through said rail and threadily engaging said first inner splice bar for tightening therein, whereby said inner and outer splice bars are bolted together on said rails about the adjacent terminal ends thereof thereby providing a bolted joint for said rails.

4. The device in claim 3 wherein there are at least two bolt holes on each side of each of said rail with corresponding holes in said respective inner splice bar and said outer splice bar thereby forming a rail with positions for receiving a total of eight bolts.

5. In a double splice bar rail joint adaptable for connecting the terminal ends of two conventional rails together by modifying conventional splices wherein outer splice bars one on each side of said rail have identical matching holes formed therein to match with holes formed in the rail web wherein the splice bar holes are normally in alignment with each other and said rail hole, said rail having additional through holes formed therein adjacent a respective hole in said rail, a first elongated, inner splice bar positioned between one of said outer splice bars and said rail on one side thereof and having through openings therein for alignment with an opening in said outer splice bar and said rail, said first inner splice bar having threaded openings therein for alignment with the usual openings in said rail and the conventional openings in said outer splice bar to receive a bolt therethrough, a second inner splice bar substantially identical in size and shape with said first inner splice bar and having holes therein positioned with substantially identical spacing to those in said first inner splice bar, said openings in said second inner splice bar being for alignment with the additional holes created in said rail, said second inner splice bar being out of alignment with said first splice bar so that the holes therein match the holes in said rail, said outer splice bar on said second inner splice bar being out of alignment with said other outer splice bar so that the holes therein align with said second inner splice bar, said first and said second splice bars extending continuously from one rail across the ends of said adjacent rail ends, bolt means having threaded ends insertible through the holes in said outer splice bar, first inner splice bar, and said rail and threadily engaging said second inner splice bar for tightening therein, other bolt means having threaded ends insertible from the other side through said holes in said outer splice bar, through said second inner splice bar and through said rail and threadily engaging said first inner splice bar for tightening therein.

6. The device in claim 5 wherein there are at least two bolts positioned on each side of each of said rails near their terminal, adjacent ends thereby providing a joint with at least 8 bolt positions.

References Cited in the file of this patent

UNITED STATES PATENTS

| | | |
|---|---|---|
| 376,402 | Williams | Jan. 10, 1888 |
| 756,380 | Lang | Apr. 5, 1904 |
| 1,388,184 | Hyle | Aug. 23, 1921 |
| 2,147,342 | Hill | Feb. 14, 1939 |